United States Patent [19]

Jolley

[11] Patent Number: 5,094,768

[45] Date of Patent: Mar. 10, 1992

[54] LIQUID COMPOSITIONS FOR REFRIGERATION SYSTEMS CONTAINING BORON COMPOSITIONS

[75] Inventor: Scott T. Jolley, Mentor, Ohio

[73] Assignee: Lubrizol Genetics, Inc., Wickliffe, Ohio

[21] Appl. No.: 502,487

[22] Filed: Mar. 30, 1990

[51] Int. Cl.$^5$ .................. C09K 5/00; C10M 105/76; C10M 105/08

[52] U.S. Cl. ........................ 252/67; 252/32; 252/49.6; 252/68

[58] Field of Search ............. 252/67, 32, 68, 49.6

[56] References Cited

U.S. PATENT DOCUMENTS

| | | | |
|---|---|---|---|
| 2,550,113 | 4/1951 | Flowers | 252/68 |
| 4,068,706 | 1/1978 | Mahler | 252/68 |
| 4,428,854 | 1/1984 | Enjo et al. | 252/69 |
| 4,623,475 | 11/1986 | Enjo et al. | 252/68 |
| 4,755,316 | 7/1988 | Magid et al. | 252/68 |

FOREIGN PATENT DOCUMENTS 1474048 5/1977 United Kingdom .

Primary Examiner—Paul Lieberman
Assistant Examiner—William S. Parks
Attorney, Agent, or Firm—Frederick D. Hunter; James A. Cairns; Forrest L. Collins

[57] ABSTRACT

This invention relates to a composition comprising:
(A) a major amount of a fluorine-containing hydrocarbon containing one or two carbon atoms; and
(B) a minor amount of at least one soluble boron-containing composition prepared by reacting a boron source with a monohydroxy alcohol, an alkylene glycol, a polyoxyalkylene glycol, hydrocarbyloxyalkylene glycol, a hydrocarbylcarbonyl polyoxyalkylene glycol, a hydroxy amine, or mixtures of two or more thereof, provided that the boron-containing composition is substantially free of hydroxyl groups.

The present invention provides compositions which are useful in refrigerators or air conditioners including auto, home and industrial air conditioners. The invention provides boron-containing compositions which are compatible with fluorine-containing hydrocarbons used in refrigerators and air conditioners.

35 Claims, No Drawings

LIQUID COMPOSITIONS FOR REFRIGERATION SYSTEMS CONTAINING BORON COMPOSITIONS

FIELD OF THE INVENTION

This invention relates to liquid compositions and more particularly to liquid compositions containing boron compositions useful as synthetic lubricants for refrigeration systems.

BACKGROUND OF THE INVENTION

Chlorofluorocarbons, generally referred to in the industry as CFCs, have been widely used in refrigeration systems. The use of CFCs has been diminishing in recent years because of demands from environmentalists for the reduction if not complete ban of the use of CFCs because of the detrimental effect of CFCs on the atmosphere's ozone layer. Examples of CFCs include CFC-11 which is chlorotrifluoromethane, CFC-12 which is dichlorodifluoromethane, and CFC-113 which is 1,2,2-trifluoro-1,1,2-trichloroethane. Finding a safe replacement of CFC refrigerants has been a problem which has been difficult to solve. Several replacement candidates have been suggested as alternatives to the fully halogenated hydrocarbons. Examples of safe alternatives include halogenated hydrocarbons containing at least one hydrogen atom such as HCFC-22 which is difluorochloromethane, HCFC-123 which is 1,1-dichloro-2,2,2-trifluoroethane, HFC-134a which is 1,1,1,2-tetrafluoroethane, and HCFC-141b which is 1,1-dichloro-1-fluoroethane.

The ozone depletion potential of these proposed substitutes is significantly less than the ozone depletion potential of the previously used CFCs. Ozone depletion potential is a relative measure of a capability of a material to destroy the ozone layer in the atmosphere. HCFC-22 and HFC-134a generally are recommended as being candidates in refrigerant applications, and HFC-134a is particularly attractive because its ozone depletion potential has been reported as being zero.

The problem with using these alternative materials is that the alternative materials have different solubility characteristics than the CFCs used in refrigerants presently. For example, mineral lubricating oil is incompatible (i.e., insoluble) in HFC-134a. Such incompatibility results in unacceptable compressor life in compressor-type refrigeration equipment including refrigerators and air-conditioners including auto, home and industrial airconditioners. The problem is particularly evident in auto air-conditioning systems since the compressors are not separately lubricated, and the mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

U.S. Pat. No. 4,428,854, issued to Enjo et al, relates to an absorption refrigerant composition comprising 1,1,1,2-tetrafluoroethane and an organic solvent capable of dissolving the ethane. Nitrogen compound type, ether type, ester type and phosphate type solvents are disclosed.

U.S. Pat. No. 4,755,316, issued to Magid et al, relates to lubricants for refrigeration systems using tetrafluoroethane. The fluids employ certain polyoxyalkylene glycols as lubricating oils. Magid et al discloses additives which may be used to enhance performance such as extreme pressure and antiwear agents; oxidation and thermal stability improvers; viscosity index improvers; pour point and/or floc point depressants; detergents; anti-foaming agents and viscosity adjusters.

SUMMARY OF THE INVENTION

This invention relates to a composition comprising:
(A) a major amount of a fluorine-containing hydrocarbon containing one or two carbon atoms; and
(B) a minor amount of at least one soluble boron-containing composition prepared by reacting a boron source with a monohydroxy alcohol, an alkylene glycol, a polyoxyalkylene glycol, hydrocarbyloxyalkylene glycol, a hydrocarbylcarbonyl polyoxyalkylene glycol, a hydroxy amine, or mixtures of two or more thereof, provided that the boron-containing composition is substantially free of hydroxyl groups.

The present invention provides compositions which are useful in refrigerators or air conditioners including auto, home and industrial air conditioners. The invention provides boron-containing compositions which are compatible with fluorine-containing hydrocarbons used in refrigerators and air conditioners.

DETAILED DESCRIPTION OF THE INVENTION

In the specification and claims, unless the context indicates otherwise, the use of the term hydrocarbyl or alkyl-group is meant to encompass all isomeric arrangements of the group, such as primary, secondary, and tertiary, as well as iso- and neo-arrangements of the group.

In the specification and claims, the use of the term alkylene or hydrocarbylene is meant to encompass divalent hydrocarbon or hydrocarbyl groups. For instance, propylene is a divalent hydrocarbon group having 3 carbon atoms.

Throughout this specification and claims, all parts and percentages are by weight, temperatures are in degrees Celsius, and pressures are at or near atmospheric unless otherwise clearly indicated.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group. Non-hydrocarbon substituents include halo (especially chloro and fluoro), hydroxy, alkoxy, mercapto, alkylmercapto, nitro, nitroso, sulfoxy, etc., groups. The hydrocarbyl group may also have a heteroatom, such as sulfur, oxygen, or nitrogen, in a ring or chain. In general, no more than about 2, preferably no more than one, non-hydrocarbon substituents will be present for every ten carbon atoms in the hydrocarbyl group. Typically, there will be no such non-hydrocarbon substituents in the hydrocarbyl group. Therefore, the hydrocarbyl group is purely hydrocarbon.

The term "lower" as used herein in conjunction with terms such as hydrocarbyl, alkyl, alkenyl, alkoxy, and the like, is intended to describe such groups which contain a total of up to 7 carbon atoms.

(A) Fluorine-Containing Hydrocarbon

The fluorine-containing hydrocarbon present in the liquid compositions contains at least one C-H bond as well as C-F bonds. In addition to these two essential types of bonds, the hydrocarbon also may contain other carbon-halogen bonds such as C-Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons (hydrofluorocarbons or HFCs). The hydrocarbons containing chlorine as well as fluorine and hydrogen are referred to as chlorofluorohydrocarbons (hydrochlorofluorocarbons or HCFCs). The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering. pp. 33-34, July, 1988.

Examples of other fluorine-containing hydrocarbons which may be useful in the liquid compositions of the present invention include trifluoromethane, 1,1,1-trifluoroethane, 1,1-difluoroethane, and 1,1,2,2-tetrafluoroethane.

In general, fluorine-containing hydrocarbons which are useful as refrigerants are fluoromethanes and fluoroethanes boiling at a relatively low temperature at atmospheric pressure, e.g., below 30° C. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise equal to or greater than about 50% up to about 99% by weight of the fluorine-containing hydrocarbon. In another embodiment, the liquid compositions contain from about 70% to about 99% by weight of the fluorine-containing hydrocarbon.

(B) Boron-Containing Compositions

In addition to the fluorine-containing hydrocarbon, the liquid compositions of the present invention comprise the boron-containing composition described herein.

The boron-containing compositions of the present invention are prepared by reacting a boron source with a monohydroxyalcohol, an alkylene glycol, a polyoxyalkylene glycol, a hydrocarbyloxyalkylene glycol, a hydrocarbyl carbonyl polyoxyalkylene glycol, and N-alkyl alkanolamine, or mixtures of two or more thereof, provided that the boron-containing composition is substantially free of hydroxyl groups. Hydroxyl groups are believed to have an adverse effect on solubility of compositions in fluorine-containing hydrocarbons. Some hydroxyl groups may be present on the boron-containing composition provided that the boron-containing composition is still soluble in the fluorine-containing hydrocarbon.

The boron source includes boron oxide, boron oxide hydrate, boron trioxide, boron trifluoride, boron tribromide, boron trichloride, boron acids such as boronic acid (i.e., alkyl-$B(OH)_2$ or aryl-$B(OH)_2$), boric acid (i.e., $H_3BO_3$), tetraboric acid (i.e., $H_2B_4O_7$), metaboric acid (i.e., $HBO_2$), boron anhydrides, boron amides and various esters of such boron acids. The use of complexes of boron trihalide with ethers, organic acids, inorganic acids, or hydrocarbons is a convenient means of introducing the boron reactant into the reaction mixture. Such complexes are known and are exemplified by boron-trifluoride-triethyl ether, boron trifluoride-phosphoric acid, boron trichloride-chloroacetic acid, boron tribromide-dioxane, and boron trifluoride-methyl ethyl ether.

Specific examples of boronic acids include methyl boronic acid, phenyl-boronic acid, cyclohexyl boronic acid, p-heptylphenyl boronic acid and dodecyl boronic acid.

The boron acid esters include especially mono-, di-, and tri-organic esters of boric acid with alcohols or phenols such as, e.g., methanol, ethanol, propanol, 1-octanol, benzyl alcohol, ethylene glycol, glycerol, Cellosolve, phenol. Lower alcohols, 1,2-glycols, and 1-3-glycols, i.e., those having less than about 8 carbon atoms are especially useful for preparing the boric acid esters for the purpose of this invention. Methods for preparing the esters of boron acid are known and disclosed in the art (such as "Chemical Reviews," pp. 959–1064, Vol. 56).

The monohydroxy alcohols have from 1 to about 8 carbon atoms, more preferably 1 to about 6, more preferably 1 to about 4. Examples of monohydroxy alcohols include methyl, ethyl, isopropy, propyl, butyl, isobutyl, hexyl and 2-ethylhexyl alcohols.

The alkylene glycols generally contain from 2 to about 8 carbon atoms, preferably 2 to about 6, more preferably 2 to about 4. Alkylene glycols include ethylene glycols, including di- and triethylene glycol; propylene glycols, including di- and tripropylene glycol; butylene glycols, including di- and tributylene glycol; butanediol; neopentyl glycol; hexanediol; and cyclohexanediol; preferably, ethylene glycols and propylene glycols.

The polyoxyalkylene glycols are polymers of one or more alkylene oxides, such as ethylene oxide, propylene oxide, or butylene oxide. Preferably, the polyoxyalkylene glycols are polyoxyethylene glycols or polyoxypropylene glycols. Useful polyoxyethylene glycols are available from Union Carbide under the trade name Carbowax® PEG 300, 600, 1000 and 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide under the trade name NIAX 425 and NIAX 1025. Useful polyoxypropylene glycols are available from Dow Chemical and sold by the trade name PPG-1200 and PPG-2000.

Representative of other useful polyoxyalkylene glycols are the liquid polyols available from Wyandotte Chemicals Company under the name PLURONIC Polyols and other similar polyols. These PLURONIC Polyols correspond to the formula

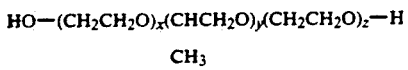

$$\mathrm{HO-(CH_2CH_2O)_x(CHCH_2O)_y(CH_2CH_2O)_z-H}$$
$$\mathrm{CH_3}$$

wherein x, y, and z are integers greater than 1 such that the —$CH_2CH_2O$— groups comprise from about 10% to about 15% by weight of the total molecular weight of the glycol, the average molecular weight of said polyols being from about 2500 to about 4500. This type of polyol can be prepared by reacting propylene glycol with propylene oxide and then with ethylene oxide.

The hydrocarbyloxyalkylene glycol preferably has from 1 to about 50 oxyalkylene groups and from 1 to about 18 carbon atoms in the hydrocarbyl group. Preferably hydrocarbyloxyalkylene glycol is an alkyloxyalkylene glycol. In one embodiment, the hydrocarbyloxyalkylene glycol has one oxyalkylene group, more preferably an oxyethylene or an oxypropylene group and from 1 to about 12 carbon atoms in the hydrocarbyl group, more preferably 1 to about 6, more preferably 1 to about 4. Examples of these compounds include methoxyethanol, methoxypropanol, ethoxyethanol, ethoxypropanol, propoxyethanol, propoxypropanol, butoxyethanol and butoxypropanol.

In another embodiment, the hydrocarbyloxyalkylene glycol is a hydrocarbyl terminated polyoxyalkylene glycol. The hydrocarbyl terminated polyoxyalkylene glycols are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol. Preferably, the hydrocarbyl terminated polyoxyalkylene is an alkyl terminated polyoxyalkylene. A variety of alkyl terminated polyoxyalkylenes are known in the art, and many are available commercially.

The alkyl terminated polyoxyalkylene glycols useful in the present invention are available commercially under such trade names as "TRITON®" from Rohm & Haas Company, "Carbowax®" and "TERGITOL®" from Union Carbide, "ALFONIC®" from Conoco Chemicals Company, and "NEODOL®" from Shell Chemical Company. The TRITON® materials are identified generally as polyethoxylated alcohols or phenols. The TERGITOLS® are identified as polyethylene glycol ethers of primary or secondary alcohols; the ALFONIC® materials are identified as ethoxylated linear alcohols which may be represented by the general structural formula $$\mathrm{CH_3(CH_2)_dCH_2(OCH_2CH_2)_eOH}$$

wherein d varies between 4 and 16 and e is a number between about 3 and 11. Specific examples of ALFONIC® ethoxylates characterized by the above formula include ALFONIC® 1012-60 wherein d is about 8 to 10 and e is an average of about 5 to 6; ALFONIC® 1214-70 wherein d is about 10-12 and e is an average of about 10 to about 11; ALFONIC® 1412-60 wherein d is from 10-12 and e is an average of about 7; and ALFONIC® 1218-70 wherein d is about 10-16 and e is an average of about 10 to about 11.

The Carbowax® methoxy polyethylene glycols are linear ethoxylated polymer of methanol. Examples of these materials include Carbowax® methoxy polyethylene glycol 350, 550 and 750, wherein the numerical value approximates molecular weight.

The NEODOL® ethoxylates are ethoxylated alcohols wherein the alcohols are a mixture of alcohols containing from 12 to about 15 carbon atoms, and the alcohols are partially branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23-6.5 is a partially branched chain alcoholate of 12 to 13 carbon atoms with an average of about 6 to about 7 ethoxy units.

Preferably, the hydrocarbylcarbonyl polyoxyalkylene glycol is a polyoxyalkylene fatty ester. Polyoxyalkylene fatty esters may be prepared from any polyoxyalkylene glycol and a fatty acid. Preferably, the polyoxyalkylene glycol is a polyethylene glycol or polypropylene glycol. The fatty acid has from 4 to about 30 carbon atoms. Examples of fatty acids include octyl, decyl, dodecyl, tetradecyl, oleyl, soya, tallow and cocoa fatty acids. Polyoxyalkylene fatty esters are available commercially from Armak Company under the tradename Ethofat ™. Specific examples of polyoxyalkylene fatty esters include Ethofat ™ C/15 and C/25, which are coco fatty esters formed using 5 and 15 moles, respectively, of ethylene oxide; Ethofat ™ O/15 and O/20, which are oleic esters formed using 5 and 10 moles of ethylene oxide; and Ethofat 60/15, 60/20 and 60/25 which are stearic esters formed with 5, 10 and 15 moles of ethylene oxide respectively.

The hydroxyamine may be an alkanolamine or a polyoxyalkylated amine. The hydroxyamine may be tertiary alkanol amines or mixtures thereof. Such amines may be represented by the formula:

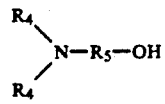

$$\begin{array}{c}R_4\\ \diagdown\\ N-R_5-OH\\ \diagup\\ R_4\end{array}$$

wherein each $R_4$ is independently a hydrocarbyl group of one to about eight carbon atoms or hydroxyhydrocarbyl group of two to about eight carbon atoms and $R_5$ is a divalent hydrocarbyl group of about two to about 18 carbon atoms. The group —$R_5$—OH in such formula represents the hydroxyhydrocarbyl group. $R_5$ can be an acyclic, alicyclic or aromatic group. Typically, $R_5$ is an acyclic straight or branched alkylene group such as an ethylene, propylene, 1,2-butylene, 2,3-butylene or 1,2-octadecylene group, more preferably an ethylene or propylene group, more preferably an ethylene group. Where two $R_4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperazines, -piperidines, -oxazolidines, -thiazolidines and the like. Typically, however, each R is independently a methyl, ethyl, propyl, isopropyl, butyl, isobutyl, pentyl, or hexyl group.

Preferably, the alkanolamine is a N-hydrocarbylalkanolamine. Preferably, the N-hydrocarbylalkanolamine has a hydrocarbyl group defined the same as when $R_1$ is a hydrocarbyl group above. Preferably the alkanol portion of the amine contains from 1 to about 10 carbon atoms, preferably 2 to about 8, more preferably 2 to about 4. Preferably the alkanol portion is an ethanol group. Preferably the N-hydrocarbylalkanolamine is an N-alkylalkanolamine. Preferably the N-alkylalkanolamine has an alkyl group having from 1 to about 12 carbon atoms, more preferably 1 to about 8, more preferably 1 to about 4; and two alkanol groups. Examples of these alkanolamines include methyldiethanol amine, triethanol amine, diethylethanol amine, ethyldiethanol amine, butyldiethanol amine, octyldiethanol amine, etc.

The hydroxyamines can also be an ether N-(hydroxyhydrocarbyl)amine. These are hydroxypoly(hydrocarbyloxy) analogs of the above-described alkanolamines (these analogs also include hydroxyl-substituted oxyalkylene analogs). Such N-(hydroxyhydrocarbyl) amines can be conveniently prepared by reaction of epoxides with afore-described amines and can be represented by the formula:

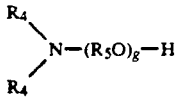

wherein g is a number from about 2 to about 15 and $R_4$ and $R_5$ are as described above. $R_4$ may also be a hydroxypoly(hydrocarbyloxy) group.

In another embodiment, the hydroxy compound is a hydroxyamine, which can be represented by the formula

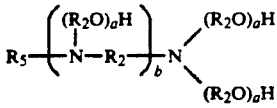

wherein each $R_2$ is an alkylene group, $R_5$ is a hydrocarbyl group; each a is independently an integer from zero to 50, provided at least one a is an integer greater than zero; and b is zero or one.

Preferably, $R_5$ is a hydrocarbyl group having from 1 to about 20 carbon atoms, preferably 1 to about 18, more preferably 1 to about 12 carbon atoms. $R_5$ is preferably an alkyl group. $R_5$ is preferably a methyl, ethyl, propyl, isopropyl, butyl, isobutyl, hexyl, 2-ethylhexyl, octyl, decyl, dodecyl, tridecyl, tetradecyl, hexadecyl, octadecyl, oleyl, soya or tallow group.

a is preferably 1 to about 50, more preferably 2 to about 30, more preferably 2 to about 20, more preferably 3 to about 10.

$R_2$ is as described above. Preferably, each $R_2$ is independently an ethylene or propylene group.

The above hydroxyamines can be prepared by techniques well known in the art, and many such hydroxyamines are commercially available. They may be prepared, for example, by reaction of primary amines containing at least 6 carbon atoms with various amounts of alkylene oxides such as ethylene oxide, propylene oxide, etc. The primary amines may be single amines or mixtures of amines such as obtained by the hydrolysis of fatty oils such as tallow oils, sperm oils, coconut oils, etc. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

The useful hydroxyamines where b in the above formula is zero include 2-hydroxyethylhexylamine, 2-hydroxyethyloctylamine, 2-hydroxyethylpentadecylamine, 2-hydroxyethyloleylamine, 2-hydroxyethylsoyaamine, bis(2-hydroxyethyl)hexylamine, bis(2-hydroxyethyl)oleylamine, and mixtures thereof. Also included are the comparable members wherein in the above formula at least one a is an integer greater than 2, as for example, 2-hydroxyethoxyethylhexylamine.

A number of hydroxyamines wherein b is zero are available from the Armak Chemical Division of Akzo, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen O/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively. "Propomeen O/12" is the condensation product of one mole of oleyl amine with 2 moles propylene oxide. Preferably, the salt is formed from Ethomeen C/15 or S/15 or mixtures thereof.

Commercially available examples of hydroxyamines where b is 1 include "Ethoduomeen T/13", "T/20" and "T/25" which are ethylene oxide condensation products of N-tallow trimethylene diamine containing 3, 10 and 15 moles of ethylene oxide per mole of diamine, respectively.

The above boron source may also be reacted with combinations of compounds. The boron source is reacted with a mixture of compounds so that the resulting boron-containing composition is substantially free of hydroxyl groups. Examples of mixtures of compounds include monohydroxy alcohols with hydrocarbyl terminated polyoxyalkylenes; hydrocarbyl terminated polyoxyalkylenes with N-alkyl alkanolamine; alkylene glycol and monohydroxy alcohols; and the like. Preferably, the born source is reacted with a hydrocarbyl terminated polyoxyalkylene and an N-alkyl alkanolamine. The boron source is reacted with the mixture of compounds in an amount that provides three hydroxyl groups from the mixture for every one boron atom of the boron source.

The boron source is reacted with the above compounds at an equivalent ratio of about (1:3) to (3:1). The reaction temperature is from about 50° C. to about 200° C., preferably 75° C. to about 175° C., more preferably 90° C. to about 150° C.

Some of the boron-containing compositions are represented by one of the formulae:

$$R_1-B(R_1)-R_1 \quad (I)$$

$$R_1-B(R_1)-O+R_2-(OR_2)_m-O+_n B(R_1)-R_1 \quad (II)$$

or

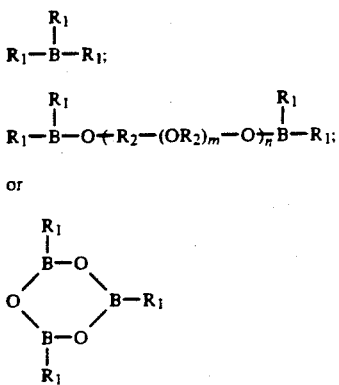

(III)

wherein m is a number from zero to 50; wherein n is zero or one; wherein each $R_1$ is independently a hydrocarbyloxy group, a hydrocarbyl oxyalkylene group, a hydrocarbylcarbonyl polyoxyalkylene group, or two $R_1$ groups taken together form $$-(OR_2)_p-\overset{R_3}{\underset{|}{N}}-(R_2O)_p-$$

wherein each $R_2$ is independently a hydrocarbylene group; wherein $R_3$ is a hydrocarbyl or a hydrocarbylcarbonyl group; and wherein p is a number from 1 to about 50.

Preferably each $R_1$ is independently a hydrocarbyloxy group. When $R_1$ is a hydrocarbyloxy group, preferably each $R_1$ is independently a hydrocarbyloxy group having from 1 to about 18 carbon atoms, preferably 1 to about 16, more preferably 3 to about 14. In one embodiment, each $R_1$ is independently a straight-chain hydrocarbyloxy group having from 1 to about 10 carbon atoms, preferably 1 to about 8, more preferably 1 to about 6. In another embodiment, each $R_1$ is independently a branched-chain hydrocarbyloxy group having from 3 to about 16 carbon atoms, preferably about 4 to about 14, more preferably about 8 to about 14. Preferably each $R_1$ is an alkyloxy group. Examples of $R_1$ include methyloxy, ethyloxy, propyloxy, isopropyloxy, butyloxy, isobutyloxy, hexyloxy, isohexyloxy, 2-ethylhexyloxy, octyloxy, isooctyloxy, isononyloxy, isodecyloxy, isododecyloxy and isotridecyloxy groups.

When $R_1$ is a hydrocarbyloxyalkylene group, preferably each $R_1$ is independently hydrocarbyloxyalkylene having from 1 to about 20 oxyalkylene groups and from 1 to about 18 carbon atoms in the hydrocarbyl group. Preferably each $R_1$ is independently an alkyloxyalkylene group. In one embodiment, the hydrocarbyloxyalkylene group preferably has one oxyalkylene group, group, more preferably an oxyethylene or an oxypropylene group and from 1 to about 12 carbon atoms in the hydrocarbyl group, more preferably 1 to about 6, more preferably 1 to about 4. Examples of these $R_1$ groups include methoxyethyl, methoxypropyl, ethoxyethyl, ethoxypropyl, propoxyethyl, propoxypropyl, and butoxyethyl and butoxypropyl.

In another embodiment, $R_1$ is a hydrocarbyloxyalkylene, which is a hydrocarbyl terminaled polyoxyalkylene. Preferably, each $R_1$ is independently hydrocarbyl terminated polyoxyalkylene having from 2 to about 30 oxyalkylene groups, more preferably about 2 to about 20, more preferably about 3 to about 15, more preferably about 3 to about 10. The alkylene portion of the group preferably has from 1 to about 8 carbon atoms, more preferably about 2 to about 4, more preferably 2 or 3. The alkylene portion is preferably ethylene, propylene or mixtures thereof. The hydrocarbyl portion of the hydrocarbyl terminated polyoxyalkylene is defined the same as when $R_1$ is a hydrocarbyl group above.

When $R_1$ is a hydrocarbonylcarbonyl polyoxyalkylene group the hydrocarbyl portion of the group is defined the same as when $R_1$ is a hydrocarbyl group. The polyoxyalkylene portion of the group is defined the same as the polyoxyalkylene group when $R_1$ is a hydrocarbyl terminated polyoxyalkylene.

In another embodiment, $R_1$ taken together with another $R_1$ form $$-(OR_2)_p-\overset{R_3}{\underset{|}{N}}-(R_2O)_p-$$

Each $R_2$ is preferably a hydrocarbylene group having from 1 to about 12 carbon atoms, more preferably 1 to about 6, more preferably 2 to about 4. $R_2$ may be alkylene, arylene, alkarylene or aralkylene, preferably alkylene. Examples of $R_2$ include methylene, ethylene, butylene and styrylene, more preferably ethylene and propylene. $R_3$ is a hydrocarbyl group defined the same as $R_1$ where $R_1$ is a hydrocarbyl group. Preferably, $R_3$ is a hydrocarbyl group having from 1 to about 8 carbon atoms, more preferably 1 to about 6, more preferably 1 to about 4. $R_3$ is preferably an alkyl group. Examples of $R_3$ include methyl, ethyl, propyl, butyl and hexyl groups.

Preferably m is zero to about 30. Preferably m is 2 to about 30, more preferably 2 to about 20, more preferably 3 to about 15, more preferably from about 3 to about 10.

The following are examples of boron-containing compositions useful in the present invention. The solubility of the boron-containing compositions in fluorohydrocarbons such as 1,1,1,2-tetrafluoroethane at low temperatures is determined in the following manner. The boron-containing composition (0.5 gram) is placed in a thick-walled glass vessel equipped with a removable pressure gauge. The tetrafluoroethane (4.5 grams) is condensed into the cooled (−40° C.) glass vessel, and the contents are warmed to the desired temperature and mixed to determine if the lubricant is soluble in the tetrafluoroethane. If soluble, the temperature of the mixture is reduced until a separation and/or precipitate is observed.

EXAMPLE 1

A reaction vessel, equipped with a stirrer, a gas inlet, a water trap and an additional funnel, is charged with 648 parts (9 moles) of 2-methoxyethanol and 184 parts (3 moles) of boric acid. The mixture is heated to 110° C. and the reaction temperature is maintained for 3 hours. The reaction is vacuum stripped at 110° C. and 15–25 millimeters of mercury. The product was soluble in R-134a to less than −40° C.

EXAMPLE 2

A reaction vessel, equipped as described in Example 1, was charged with 1,050 parts (3 equivalents) of Carbowax 350, a methyl terminated polyoxyethylene glycol having the molecular weight of approximately 350, and 62 parts (1 mole) of boric acid. The mixture is heated to 120° C. and held for 12 hours while 1½ moles of water are collected. More boric acid (62 parts, 1 mole) is added to the reaction. The reaction temperature is raised to 200° C. and held for three hours. The product has a specific gravity of 1.127 and a kinematic viscosity at 100° C. of 10.8 centistokes. The product is soluble in R-134a to less than −50° C.

EXAMPLE 3

A reaction vessel, equipped as described in Example 1, is charged with 62 parts (1 mole) of boric acid, and 161 parts (1 mole) of N-butyldiethanolamine. The mixture is heated to 110° C. while 2 moles of water are removed. Then, Carbowax 350 (350 parts, 1 mole) is added to the mixture. The mixture is heated to 160° C. and held for 12 hours. Thirteen milliliters of water are collected. The product has a specific gravity of 1.099, 2.64% nitrogen (theoretical 2.7%) and a kinematic viscosity at 100° C. of 33.4 centistokes. The product is soluble in R-134a to less than −40° C.

LIQUID COMPOSITIONS

The liquid compositions of the present invention comprise a major amount of a fluorine-containing hydrocarbon and a minor amount of at least one soluble boron-containing composition of the types described above. "Major amount" is meant to include an amount equal to or greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70 to about 99% of the fluorine-containing hydrocarbon (A) and from about 0.1% to about 30%, preferably from about 0.5% to about 25%, more preferably from about 1% to about 22% by weight of the boron-containing compositions (B). In another embodiment, the boron-containing compositions (B) may be used as a lubricant or a component of a lubricant formulation. (B) is present, as a lubricant, in an amount from about 9% to about 30%, preferably about 9% to about 25%, more preferably about 10% to about 20% by weight of the liquid compositions. Lubricants for refrigerators should have a kinematic viscosity at 100° C. of at least 3 centistokes (cSt), preferably about 3 cSt to about 2000 cSt, more preferably about 3 to about 20. For automotive air-conditioning systems, the lubricant should have a viscosity greater than about 10 cSt, preferably from about 10 cSt to about 2000 cSt, more preferably about 10 to about 50.

In another embodiment, the boron-containing compositions (B) are present as additives in a lubricant formulation. When (B) is an additive, it is present in an amount from about 0.1% to about 8%, preferably about 0.5% to about 6%, more preferably from 0.75% to about 5% by weight, i.e., fluorine-containing hydrocarbon plus lubricant. Preferably the lubricant formulation contains a polyoxyalkene glycol (C-1) or a carboxylic ester (C-2 or C-3) about 25% by weight of the liquid composition, more preferably from about 10 to about 20%.

(C) Polyglycol or Carboxylic Ester

The polyoxyalkylene glycol (C-1) or carboxylic ester (C-2 & C-3) is present in an amount up to where the total amount of boron-containing composition plus the amount of polyoxyalkylene glycol or carboxylic ester is in a "minor amount", up to about 49.9% by weight. Preferably the polyoxyalkylene glycol or carboxylic ester is present in an amount up to 40% by weight, more preferably up to 30% by weight, more preferably up to 20% by weight.

In another embodiment, the combined amount of the boron-containing composition and the polyoxyalkylene glycol or carboxylic ester are present in an amount from about 5% to about 40%, preferably from about 7.5% to about 30%, more preferably from about 10% to about 20%, where all percentages are by weight of the liquid composition.

Useful polyoxyalkylene glycols have a molecular weight between about 300 and about 2000, a viscosity of about 25 to 150 centistokes at 37° C., and a viscosity index of at least 20. The polyoxyalkylene glycols may be any of the polyoxyalkylene glycols described above. Preferably the polyoxyalkylene glycol is a polyoxypropylene glycol.

In one embodiment, the carboxylic ester comprises (C-2) at least one carboxylic ester compound characterized by the following formula

$$R'O(R'_1O)_qC(O)R'_2 \quad (IV)$$

or

$$R'_3OC(O)R'_2 \quad (V)$$

wherein R' is a hydrocarbyl group of at least 2 carbon atoms, $R'_1$ is a hydrocarbylene group, $R'_2$ is H, hydrocarbyl, —CF$_3$, —R'$_4$CN, —R'$_4$—NO$_2$, or R'$_5$OCH(R'$_6$)—, $R'_3$ is a —R'$_4$CF$_3$, —R'$_4$CN or —R'$_4$NO$_2$ group, provided that R'$_3$ may be a hydrocarbyl group when R'$_2$ is —R'$_4$CN, q is an integer from 1 to about 50, $R'_4$ a hydrocarbylene group, $R'_5$ is H, a lower hydrocarbyl group or R'$_7$C(O)— where R' is a hydrocarbyl group, and $R'_6$ is H or a lower hydrocarbyl group.

In the above Formulae (IV) and (V), R' is a hydrocarbyl group of at least 2 carbon atoms and more particularly is an alkyl group containing from 2 to about 50 carbon atoms. Branched-chain alkyl groups are particularly useful as R' groups since the presence of the branching appears to improve the solubility of the lubricant in the fluorine-containing hydrocarbon. Examples of R' groups include ethyl, propyl butyl, hexyl octyl, decyl, dodecyl, tridecyl, hexadecyl, octadecyl, higher alkyl groups, and mixtures of one or more of these. R'$_1$ is a hydrocarbylene group preferably containing from 1 to about 7 carbon atoms. Alkylene groups such as methylene, ethylene, propylene, 2-methyl ethylene, 2-ethyl ethylene, etc., are examples of hydrocarbylene groups useful as R'$_1$. When R'$_2$ is a hydrocarbyl group, R'$_2$ generally will contain from 1 to about 20 carbon atoms and more often will be a lower alkyl group such as methyl, ethyl, propyl, butyl, etc.

R′$_2$ in Formulae (IV) and (V) and also may be hydrogen, —CF$_3$, —R′$_4$CN, —R′$_4$NO$_2$ or R′$_5$OCH(R′$_6$)— wherein R′$_4$ is a hydrocarbylene group, preferably an alkylene group, R′$_5$ is a lower hydrocarbyl group or R′$_7$C(O)— wherein R′$_7$ is a hydrocarbyl group, and R′$_6$ is H or a lower hydrocarbyl group. The hydrocarbylene group R′$_4$, in one embodiment, is an alkylene group containing from 1 to about 20 carbon atoms, and the alkylene group may be straight chain or branched chain. R′$_5$ may be a lower hydrocarbyl group, and specific examples of such groups include methyl, ethyl, propyl, etc. R′$_7$ is a hydrocarbyl group which may contain from 1 to about 20 carbon atoms, and in one embodiment this hydrocarbyl group also is a lower hydrocarbyl group.

The compositions represented by Formula (IV) may be prepared by techniques well known in the art. In one embodiment, esters of the type represented by Formula (IV) are prepared by the reaction of a carboxylic acid R′$_2$COOH (or its anhydride) with an alkoxy alcohol such as represented by the formula R′O(R′$_1$O)$_q$H wherein R′, R′$_1$ and n are as defined above with respect to Formula (IV). In one embodiment, R′$_1$ is a branched-chain hydrocarbylene group containing 3, 4, or 5 carbon atoms. For example R′$_1$ may be a methyl- or ethyl-substituted ethylene group derived from propylene oxide or butylene oxide.

The carboxylic acid, R′$_2$COOH, which may be reacted with the alkoxy alcohol, can be any of the carboxylic acids wherein R′$_2$ is H, hydrocarbyl, —CF$_3$, —R′$_4$CN, —R′$_4$NO$_2$, or R′$_5$OCH(R′$_6$)— wherein R′$_4$, R′$_5$ and R′$_6$ are as defined above with respect to Formulae (IV) and (V). The following examples will illustrate the various types of carboxylic acids exemplified by the formula R′$_2$COOH and some anhydrides of such acids: formic acid, acetic acid, acetic anhydride, propionic acid, trifluoroacetic acid trifluoroacetic acid anhydride, cyanoacetic acid, cyanoundecanoic acid, nitroacetic acid, 3-nitropropionic acid, glycolic acid, lactic acid, methoxyacetic acid, ethoxyacetic acid, acetylacetic acid, etc.

A variety of alkoxy alcohols are known in the art, and many are available commercially. The alkoxy alcohols are described above and referred to as hydrocarbyl or alkyl terminated polyoxyalkylene glycols.

In another embodiment, the carboxylic esters may be characterized by the following formula

R′$_3$OC(O)R′$_2$     (V)

wherein R′$_2$ is H, hydrocarbyl, hydrocarbyloxy hydrocarbyl, —CF$_3$, —R′$_4$CN, —R′$_4$NO$_2$ or R′$_5$OCH(R′$_6$)—, and R′$_3$ is a —R′$_4$CF$_3$, —R′CN or R′$_4$NO$_2$ group wherein R′$_4$, R′$_5$ and R′$_6$ are a defined in Formula (IV), provided that R′$_3$ may be a hydrocarbyl group when R′$_2$ is —R′$_4$CN. Such carboxylic esters can be prepared by techniques known in the art such as, for example, by the reaction of a carboxylic acid, R′$_2$COOH, as described above, or the anhydride of said acid with hydroxy-containing compound such as the following: R′$_3$OH; HOR′$_4$CN; HOR′$_4$NO$_2$; HOR′$_4$CF$_3$; wherein R′$_4$ is a hydrocarbylene group. In one embodiment, R′$_4$ is a straight chain or branched chain alkylene group, containing from about 1 to 20 carbon atoms and more particularly, from 1 to about 10 carbon atoms.

As noted above, R′$_3$ in Formula (V) may be a hydrocarbyl group when R′$_2$ is —R′$_4$CN. The hydrocarbyl group may contain from 1 to 50 carbon atoms, more preferably from 1 to 20. R′$_3$ is preferably a branched-chain alkyl group containing from 3 to about 20 carbon atoms. Esters characterized by Formula (V), where R′$_3$ as a hydrocarbyl group, are prepared by reacting the carboxylic acid (R′$_2$COOH) or its anhydride with an alcohol R′$_3$OH wherein R′$_3$ is as defined above. Examples of useful alcohols include methyl alcohol, ethyl alcohol, amyl alcohol, octyl alcohol, isooctyl alcohol, decyl alcohol, isodecyl alcohol, tridecyl alcohol, octadecyl alcohol, etc.

The hydroxy compound reacted with the carboxylic acid or anhydride also may be characterized by the formula, HOR′$_4$CN, wherein R′$_4$ is a hydrocarbylene group. Specific examples of such hydroxy-containing compounds include 2-cyanoethanol, 2-cyano-1-propanol, etc. Examples of hydroxy compounds characterized by the formula HOR′$_4$NO$_2$ which can be reacted with the acid or anhydride compounds include 2-nitro ethanol; 2-methyl-2-methyl-2-nitropropanol; 3-nitro-2-butanol; 2-nitro-1-propanol; 3-nitro-2-pentanol; etc. Examples of hydroxy compounds characterized by the formula HOCH$_2$CF$_3$ include 2,2,2-trifluoroethanol; 1,1,1-trifluoro-2-propanol; 2-trifluoromethyl-2-propanol; etc.

The carboxylic ester compounds useful in the present invention characterized by Formula (IV) and (V) can be prepared by reacting a carboxylic acid (R′$_2$COOH) or its anhydride with any the above-described hydroxy-containing compounds. Generally, about equivalent amounts of the acid or anhydride and the hydroxy-containing compounds are utilized in the reaction which is a typical esterification reaction. Although no catalyst is required for the anhydrides, the esterification reaction with carboxylic acid generally is acid catalyzed. Typically, about 1% by weight of an acid catalyst such as a mineral acid or para-toluene sulfonic acid is utilized in the reaction mixture. The mixture is heated and stirred while removing water when the free acids are used and, optionally excess carboxylic acid. The reaction may be conducted in the presence of solvent such as hydrocarbon solvents including toluene, xylene, etc.

The following examples illustrate the preparation of the carboxylic esters (C-2) useful in the present invention. Neutralization number is the amount in milligrams (mg) of potassium hydroxide (KOH) or hydrochloric acid (HCl) to neutralize one gram of sample.

EXAMPLE 4

Into a reaction vessel there are charged 244 parts of Neodol 23-6.5, and the content of the vessel are heated to 90° C. while blowing nitrogen through the liquid. Dropwise addition of 51 parts of acetic anhydride is begun, and the addition requires about 0.5 hour. An additional 5 parts of acetic anhydride are charged to the reaction mixture and the mixture is heated to 100° C. This procedure is repeated twice and the mixture is then maintained at about 100° C. for 2 hours whereupon the mixture is stripped to 135° C. at 30 mm.Hg. The residue is filtered through a mixture containing about 10 parts of diatomaceous and about 3 parts of calcium hydroxide. The filtrate is the desired product. The filtrate has a neutralization acid number to phenolphthalein of 2.8 mg KOH and a neutralization base number to bromophenol blue of 0.3 mg HCl.

EXAMPLE 5

A mixture of 630 parts (1 equivalent) of Alfonic 1412-60, about 75 parts (about 1.0 equivalent) of formic acid, about 50 parts of toluene and 2 parts of para-toluene sulfonic acid is prepared and heated to 110° C. with stirring. Azeotropic water is collected over 8 hours, and the reaction mixture then is stripped to 100° C. The residue is filtered, and the filtrate is the desired ester. An infrared spectrum of the filtrate shows no hydroxyl group absorbance at about 3400 cm$^{-1}$.

EXAMPLE 6

A mixture of 133 parts (0.287 mole) of Alfonic 1012-60, 20 parts (0.33 mole) of acetic acid, about 50 parts of toluene and 5 parts of an acidified clay is prepared and heated to reflux. The mixture is maintained at the reflux temperature for about 12 hours. Sulfuric acid (2 parts) is added and the reaction is carried out for an additional 8 hours while removing. The residue is filtered, and the filtrate is stripped at reduced pressure to yield a light amber oil which is the desired product.

EXAMPLE 7

Alfonic 1412-60 (127 parts, 0.25 mole) is charged to a reaction vessel, and 53 parts (0.26 mole) of trifluoroacetic acid are then added. An exothermic reaction results which raises the temperature to about 72° C. The mixture then is heated to about 110° C. for 1 hour and stripped under vacuum at 70° C. for about 1.5 hours. The residue is the desired product.

EXAMPLE 8

A mixture of 170 parts (2 moles) of cyanoacetic acid, 400 parts (2 moles) of tridecyl alcohol and 10 parts of a sulfuric acid treated clay is prepared, and the mixture is heated to about 150° C. Water is evolved very quickly and removed. The reaction mixture is cooled to 120° C. and maintained at this temperature for 6 hours. The product, after cooling, is filtered, and the filtrate is the desired product.

EXAMPLE 9

A mixture of 577 parts (1 mole) of Sandopan DTC (carboxylic acid of the general structure R'(OCH$_2$CH$_2$)$_n$OCH$_2$COOH where R' is aliphatic and n is an integer of from 1 to about 10), 119 parts (1 mole) of 2-methyl-2-nitropropanol and 10 parts of Amberlyst 15 catalyst is prepared and the temperature of the mixture is elevated. Water is evolved and removed from the reaction mixture. Maximum reaction temperature of 140° C. is attained as the water is removed. The residue is the desired product.

EXAMPLE 10

A mixture of 516 parts (3 moles) of decanoic acid and 357 parts (3 moles) of 2-methyl-2-nitropropanol is prepared, and the mixture is heated to about 150° C. Water is removed as it evolves. When all the water is removed, the reaction mixture is filtered, and the filtrate is the desired product.

Other esters of the type represented by Formulae (IV) and (V) can be prepared by procedures similar to the procedures in Examples 3-7 involving the reaction of a carboxylic acid R'$_2$COOH and the hydroxy-containing compounds discussed above. Specific examples of acids and hydroxy-containing compounds which can be reacted to form the desired esters of this invention are illustrated in Table I.

TABLE I

| Example | R'$_2$COOH | Hydroxy Compound |
|---|---|---|
| 11 | S(CH$_2$CH$_2$C(O)—OH)$_2$ | HOCH$_2$CH$_2$CN |
| 12 | O$_2$NCH$_2$CH$_2$COOH | HOCH$_2$CF$_3$ |
| 13 | octyl(OCH$_2$CH$_2$)$_6$COOH | N(CH$_2$CH$_2$OH)$_3$ |
| 14 | HOCH(CH$_3$)COOH | HOCH$_2$CH$_2$NO$_2$ |
| 15 | CH$_3$OCH$_2$COOH | Neodol 23-6.5 |
| 16 | CF$_3$COOH | i-octyl-o-(CH$_2$C(CH$_3$)$_2$—O)$_8$—H |
| 17 | succinic acid | Neodol 23-6.5 |

In another embodiment, the carboxylic ester comprises (C-3) at least one carboxylic ester of a polyhydroxy compound containing at least two hydroxy groups and characterized by the general formula $$R''(O(O)CR''_1)_r \qquad (VI)$$

wherein R'' is a hydrocarbyl group, each R''$_1$ is independently hydrogen, a straight chain lower hydrocarbyl group, a branched chain hydrocarbyl group, or a straight chain hydrocarbyl group containing from about 8 to about carbon atoms provided that at least one R''$_1$ group is hydrogen, a lower straight chain hydrocarbyl or a branched chain hydrocarbyl group, or a carboxylic acid- or carboxylic ester-containing hydrocarbon group, and r is at least 2.

The carboxylic ester is the reaction product of one or more carboxylic acids (or the lower esters thereof such as methyl,ethyl, etc.) with polyhydroxy compounds containing at least two hydroxy groups. The polyhydroxy compounds may be represented by the general formula R''(OH)$_r$ wherein R'' is a hydrocarbyl group and r is at least 2. The hydrocarbyl group may contain from 4 to about 50, more preferably from 4 to about 20, carbon atoms, and the hydrocarbyl group may also contain one or more nitrogen and/or oxygen atoms. The polyhydroxy compounds generally will contains from about 2 to about 10 hydroxy groups and more preferably from about 3 to about 10 hydroxyl groups. The polyhydroxy compound may contain one or more oxyalkylene groups, and, thus, the polyhydroxy compounds include compounds such as polyetherpolyols. The number of carbon atoms and number of hydroxy groups contained in the polyhydroxy compound used to form the carboxylic esters may vary over a wide range, and it is only necessary the carboxylic ester produced with the polyhydroxy compounds be soluble in the fluorine-containing hydrocarbon (A).

The polyhydroxy compounds used in the preparation of the carboxylic esters also may contain one or more nitrogen atoms. For example, the polyhydroxy compound may be an alkanol amine containing from 3 to 6 hydroxy groups. In one preferred embodiment, the polyhydroxy compound is an alkanol amine containing at least two hydroxy groups and more preferably at least hydroxy groups.

Specific examples of polyhydroxy compounds useful in the present invention include ethylene glycol, diethylene glycol, triethylene glycol, propylene glycol, dipropylene glycol, glycerol, neopentyl gycol, 1,2-, 1,3- and 1,4-butanediols, pentaerythritol, dipentaerythritol, tripentaerythritol, triglycerol, trimethylolpropane, sorbitol, hexaglycerol, 2,2,4-trimethyl-1,3-pentanediol, etc. Mixtures of any of the above polyhydroxy compounds can be utilized.

The carboxylic acids utilized in the preparation of the carboxylic esters (C-3) of the present invention may be characterized by the following general formula $R''_1COOH$ wherein $R''_1$ is (a), H, (b), a straight chain lower hydrocarbyl group, (c) a branched chain hydrocarbyl group, or (d) a mixture of one or both of (b) and (c) with a straight chain hydrocarbyl group containing from about 8 to about 22 carbon atoms or (e) a carboxylic acid- or carboxylic acid ester-containing hydrocarbyl group. Stated otherwise, at least one $R''_1$ group in the ester of Formula (VI) must contain a lower straight chain hydrocarbyl group or a branched chain hydrocarbyl group. The straight chain lower hydrocarbyl group ($R''_1$) contains from 1 to about 7 carbon atoms, and in a preferred embodiment, contains from 1 to about 5 carbon atoms. The branched chain hydrocarbyl group may contain any number of carbon atoms and will generally contain from 4 to about 20 carbon atoms. In one preferred embodiment, the branched chain hydrocarbon group contains from 5 to 20 carbon atoms and in a more preferred embodiment, contains from about 5 to about 14 carbon atoms. The higher molecular weight straight chain hydrocarbyl group containing from 8 to about 22 carbon atoms will contain in some embodiments, from 8 to about 18 carbon atoms, and in more preferred embodiments from 8 to about 14 carbon atoms.

In one preferred embodiment, the branched chain hydrocarbyl groups are characterized by the structure

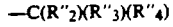

—$C(R''_2)(R''_3)(R''_4)$ wherein $R''_2$, $R''_3$ and $R''_4$ are each independently alkyl groups, and at least one of the alkyl groups contains two or more carbon atoms. Such branched chain alkyl groups, when attached to a carboxyl group are referred to in the industry as neo groups and the acids are referred to a neo acid. In one embodiment, $R''_2$ and $R''_3$ are methyl groups and $R''_4$ is an alkyl group containing two or more carbon atoms.

Any of the above hydrocarbyl groups ($R''_1$) may contain one or more carboxy groups or carboxy ester groups such as —$COOR''_5$ wherein $R''_5$ is a lower alkyl, hydroxy alkyl or a hydroxy alkyloxy group. Such substituted hydrocarbyl groups are present, for example, when the carboxylic acid, $R''_1COOH$, is a dicarboxylic acid or a monoester of a dicarboxylic acid. Generally, however, the acid $R''COOH$ is a monocarboxylic acid since polycarboxylic acids tend to form polymeric products if the reaction conditions and amounts of reactants are not carefully regulated. Mixtures of monocarboxylic acids and minor amounts of dicarboxylic acids or anhydrides are useful in preparing the carboxylic esters.

Examples of carboxylic acids containing a straight chain lower hydrocarbyl group include formic acid, acetic acid, propionic acid, butyric acid, pentanoic acid, hexanoic acid and heptanoic acid. Examples of carboxylic acids wherein the hydrocarbyl group is a branched-chain hydrocarbyl group include 2-ethyl-n-butyric acid, 2-hexyldecanoic acid, isononanoic acid, isostearic acid, 2-methylhexanoic acid, 3,5,5-trimethylhexanoic acid, 2-ethylhexanoic acid, neoheptanoic acid, neodecanoic acid, and commercial mixtures of branched chain carboxylic acids such as a mixture of neododecanoic acid and neotetradecanoic acid having a molecular weight of approximately 206 by acid number identified as Neo 1214 acid from Exxon.

The third type of carboxylic which can be utilized in the preparation of the carboxylic esters are the acids containing a straight chain hydrocarbyl group containing from 8 to about 22 carbon atoms. As noted previously, these higher molecular weight straight chain acids can be utilized only in combination with one of the other acids described above since the higher molecular weight straight chain acids are not soluble in the fluorohydrocarbons. Examples of such higher molecular weight straight chain acids include decanoic acid, dodecanoic acid, stearic acid, lauric acid, behenic acid, etc. Examples of dicarboxylic acids include maleic acid, succinic acid, etc.

In another embodiment, the carboxylic acids utilized to prepare the carboxylic esters (C-3) may comprise a mixture of a major amount of monocarboxylic acids and a minor amount of dicarboxylic acids. The presence of the dicarboxylic acids results in the formation of esters of higher viscosity. The use of mixtures containing larger amounts of dicarboxylic acids should be avoided since the product ester will contain larger amounts of polymeric esters, and such mixtures may be insoluble in the fluorohydrocarbons. An example of such a mixture of 80 parts of neoheptanoic acid and 20 parts of succinic acid.

The carboxylic esters of Formula (VI) are prepared, as mentioned above, by reacting at least one carboxylic acid with at least one polyhydroxy compound containing at least two hydroxy groups. The formation of esters by the interaction of carboxylic acids and alcohols is acid catalyzed and is a reversible process which can be made to proceed to completion by use of a large amount of alcohol or by removal of the water as it is formed in the reaction. If the ester is formed by transesterification of a lower molecular weight carboxylic ester, the reaction can be forced to completion by removal of the low molecular weight alcohol formed as a result of a transesterification reaction. The esterification reaction can be catalyzed by either organic acids or inorganic acids. Examples of inorganic acids include sulfuric acids and acidified clays. A variety of organic acids can be utilized including para-toluenesulfonic acid, acidic resins such as Amberlyst 15, etc. Organometallic catalysts include, for example tetraisopropoxy orthotitanate.

The amounts of carboxylic acids and polyhydroxy compounds included in the reaction mixture may be varied depending on the results desired. If it is desired to esterify all of the hydroxyl groups contained in the polyhydroxy compounds, sufficient carboxylic acid should be included in the mixture to react with all of the hydroxyl groups. When mixtures of the alcohols are reacted with a polyhydroxy compound in accordance with the present invention, the carboxylic acid can be reacted sequentially with the polyhydroxy compounds or a mixture of carboxylic acids can be prepared and the mixture reacted with the polyhydroxy compounds. In one preferred embodiment wherein mixtures of acids are utilized, the polyhydroxy compound is first reacted with one carboxylic acid, generally, the higher molecular weight branched chain or straight chain carboxylic acid followed by reaction with the straight chain lower hydrocarbyl carboxylic acid. Throughout the specification and claims, it should be understood that the esters also can be formed by reaction of the polyhydroxy compound with the anhydrides of any of the above-described carboxylic acids. For example, esters are easily prepared by reacting the polyhydroxy compounds either with acetic acid or acetic anhydride.

The formation of esters by the reaction of carboxylic acids or anhydrides with the polyhydroxy compounds described above can be effected by heating the acids or anhydrides, the polyhydroxy compounds, and an acid catalyst to an elevated temperature while removing water or low molecular weight alcohols formed in the reaction. Generally, temperatures of from about 75° C. to about 200° C. or higher are sufficient for the reaction. The reaction is completed when water or low molecular weight alcohol is no longer formed, and such completion is indicated when water or low molecular weight esters can no longer be removed by distillation.

In some instances, it is desired to prepare carboxylic esters wherein not all of the hydroxyl groups have been esterified. Such partial esters can be prepared by the techniques described above and by utilizing amounts of the acid or acids which are insufficient to esterify all of the hydroxyl groups.

The following examples illustrate the preparation of additional carboxylic esters (C-3) which are useful in the liquid compositions of the invention.

EXAMPLE 18

A mixture of 872 parts (6.05 moles) of 2-ethylhexanoic parts of toluene is prepared and blown with nitrogen while heating the mixture to about 60° C. Para-toluene sulfonic acid (5 parts) is added to the mixture which is then heated to the reflux temperature. A water/toluene azeotrope distills at about 120° C. A temperature of 125°–130° C. is maintained for about 8 hours followed by a temperature of 140° C. for 2 hours while removing water. The residue is the desired ester.

EXAMPLE 19

Into a reaction vessel there are charged 600 parts (2.5 moles) of triglycerol and 1428 parts (14 moles) of acetic anhydride. The mixture is heated to reflux in a nitrogen atmosphere and maintained at the reflux temperature (125°–130° C.) for about 9.5 hours. The reaction mixture is nitrogen stripped at 150° C. and 15 mm.Hg. The residue is filtered through a filter aid, and the filtrate is the desired ester.

EXAMPLE 20

A mixture of 364 parts (2 moles) of sorbitol, and 340 parts (2 moles of a commercial $C_{8-10}$ straight chain methyl ester (Procter & Gamble), is prepared and heated to 180° C. The mixture is a two-phase system. Para-toluene sulfonic acid (1 part) is added, and the mixture is heated to 150° C. whereupon the reaction commences and water and methanol evolve. When the solution becomes homogeneous, 250 parts (2.5 moles) of acetic anhydride are added with stirring. The reaction mixture then is stripped at 150° C. and filtered. The filtrate is the desired ester of sorbitol.

EXAMPLE 21

A mixture of 402 parts (3 moles) of trimethylol propane, 660 parts (3 moles) of a commercial straight chain methyl ester comprising a mixture of about 75% $C_{12}$ methyl ester and about 25% $C_{14}$ methyl ester, (CE1270 from Procter & Gamble), and tetraisopropoxy orthotitanate is prepared and heated to 200° C. with mild nitrogen blowing. The reaction is allowed to proceed overnight at this temperature, and in 16 hours, 110 parts of methanol is collected. The reaction mixture is cooled to 150° C., and 100 parts of acetic acid and 50 parts of toluene are added followed by the addition of an additional 260 parts of acetic acid. The mixture is heated at about 150° C. for several hours yielding the desired ester.

EXAMPLE 22

A mixture of 408 parts (3 moles) of pentaerythritol and 660 parts (3 moles) of the CE1270 methyl ester used in Example 21 is prepared with 5 parts of tetraisopropyl orthotitanate, and the mixture is heated to 220° C. under a nitrogen purge. No reaction occurs. The mixture then is cooled to 130° C., and 250 parts of acetic acid are added. A small amount of para-toluenesulfonic acid is added and the mixture is stirred at about 200° C. for 2 days, and 60 parts of methanol are removed. At this time, 450 parts of acetic anhydride are added and the mixture is stirred at 150° C. until the acetic acid/water azeotrope no longer evolves. The residue is filtered through a filter aid, and the filtrate is the desired ester of pentaerythritol.

EXAMPLE 23

A mixture of 544 parts (4 moles) of pentaerythritol, 820 parts (4 moles) of Neo 1214 acid, a commercial acid mixture available from Exxon, 408 parts (4 moles) of acetic anhydride and 50 parts of Amberlyst 15 is prepared and heated to about 120° C. whereupon water and acetic acid begin to distill. After about 150 parts of water/acetic acid are collected, the reaction temperature increases to about 200° C. The mixture is maintained at this temperature of several days and stripped. Acetic anhydride is added to esterify any remaining hydroxyl groups. The product is filtered and the filtrate is the desired ester.

EXAMPLE 24

A mixture of 508 parts (2 moles) of dipentaerythritol, 812 parts (8 moles) of acetic anhydride, 10 parts of acidified clay as catalyst and 100 parts of xylene is prepared and heated to 100° C. This temperature is maintained until the solid dipentaerythritol is dissolved. A water/acetic acid azeotrope is collected, and when the rate of evolution diminishes, the reaction mixture is blown with nitrogen. About 100–200 parts of acetic acid are added and the reaction is continued as additional water/acetic acid/xylene azeotrope is collected. When an infrared analysis of the reaction mixture indicates a minimum of free hydroxyl groups, the reaction mixture is stripped and filtered. The filtrate is the desired product which solidifies.

EXAMPLE 25

A mixture of 372 parts (1 mole) of tripentaerythritol, 910 parts (7 moles) of neoheptanoic acid and 30 parts of Amberlyst 15 catalyst is prepared and heated to 110° C. as water is removed. The mixture is heated for a total of 48 hours, and unreacted acid is removed by stripping the mixture. The residue is the desired ester.

EXAMPLE 26

A mixture of 1032 parts (6 moles) of neodecanoic acid and 318 parts (3 moles) of diethylene glycol is prepared and heated to 130° C. in the presence of 20 parts of Amberlyst 15. After heating for 24 hours and removing about 90 parts of water, 20 parts of Amberlyst 15 are added and the reaction is conducted for another 24 hours. The residue is the desired ester.

EXAMPLE 27

A mixture of 200 parts (2 moles) of succinic anhydride and 62 parts (1 mole) of ethylene glycol is heated to 120° C., and the mixture becomes a liquid. Five parts of acidic clay are added as catalyst, and an exotherm to about 180° C. occurs. Isooctanol (260 parts, 2 moles) is added, and the reaction mixture is maintained at 130° C. as water is removed. When the reaction mixture becomes cloudy, a small amount of propanol is added and the mixture is stirred at 100° C. overnight. The reaction mixture then is filtered to remove traces of oligomers, and the filtrate is the desired ester.

EXAMPLE 28

A mixture of 294 parts (3 moles) of maleic anhydride and 91 parts (1.5 moles) of ethylene glycol is prepared and heated at about 80° C. whereupon a strong exotherm occurs and the temperature of the mixture is raised to about 120° C. When the temperature of the mixture cools to about 100° C., 222 parts (3 moles) of n-butyl alcohol and 10 parts of Amberlyst 15 are added. Water begins to evolve and is collected. The reaction mixture is maintained at 120° C. until 50 parts of water is collected. The residue is filtered, and the filtrate is the desired product.

EXAMPLE 29

A mixture of 1072 parts (8 moles) of trimethylolpropane, 2080 parts (16 moles) of neopheptanoic acid and 50 parts of Amberlyst 15 is prepared and heated to about 130° C. A water/acid azeotrope evolves and is removed. When about 250 of the azeotrope has been removed, 584 parts (4 moles) of adipic acid are added and the reaction continues to produce an additional 450 parts of distillate. At this time, 65 parts of trimethylolpropane are added to the mixture and additional water is removed. The residue is filtered and the filtrate is the desired ester.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen.

The additives which may be included in the liquid compositions of the present invention to enhance the performance of the liquids include extreme-pressure and anti-wear agents, oxidation and thermal-stability improvers, corrosion-inhibitors, viscosity improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic alcohols, metal sulfonates, organic phosphites, etc. Viscosity improvers include polyolefins such as polybutene, polymethacrylates, etc. Pour point and floc point depressants include polymethacrylates, ethylene-vinyl acetate copolymers, maleamic acid-olefin copolymers, ethylene-alpha olefin copolymers, etc. Detergents include sulfonates, long-chain alkyl-substituted aromatic sulfonic acids, phosphonates, phenylates, metal salts of alkyl phenols, alkyl phenolaldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
|---|---|
| Example A | |
| 1,1,1,2-tetrafluoroethane (R134a) | 90 |
| Product of Example 1 | 10 |
| Example B | |
| 1,1,2,2-tetrafluoroethane | 85 |
| Product of Example 1 | 5 |
| Product of Example 4 | 10 |
| Example C | |
| 1,1,1,2-tetrafluoroethane | 95 |
| Product of Example 2 | 5 |
| Example D | |
| R134a | 80 |
| Product of Example 1 | 4 |
| Product of Example 17 | 16 |
| Example E | |
| R134a | 85 |
| Product of Example 2 | 5 |
| Polyoxypropylene glycol* | 10 |

*NIAX-425 available from Union Carbide

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:
1. A composition, comprising:
   (A) a major amount of a fluorohydrocarbon containing one or two carbon atoms; and
   (B) a minor amount of at least one soluble boron-containing composition prepared by reacting a boron source with a monohydroxy alcohol, an alkylene glycol, a polyoxyalkylene glycol, hydrocarbylox- yalkylene glycol, a hydrocarbylcarbonyl polyoxyalkylene glycol, a hydroxy amine, or mixtures of two or more thereof, provided that the boron-containing composition is substantially free of hydroxyl groups.

2. The composition of claim 1 wherein the boron source is boric acid.

3. The composition of claim 1 wherein the monohydroxy alcohol has from 1 to about 12 carbon atoms.

4. The composition of claim 1, wherein the alkylene glycol is ethylene glycol, diethylene glycol, neopentyl glycol and tripropylene glycol.

5. The composition of claim 1 wherein the polyoxyalkylene glycol is a polyoxyethylene glycol, polyoxypropylene glycol, or a glycol containing oxyethylene and oxypropylene groups.

6. The composition of claim 1 wherein the hydrocarbyl terminated polyoxyalkylene glycol is a alkyl terminated polyoxyethylene, polyoxypropylene glycol or mixtures thereof wherein the alkyl group contains from 1 to about 16 carbon atoms.

7. The composition of claim 1, wherein the hydroxyamine is represented by the formula

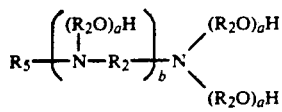

wherein b is zero or one, each $R_2$ is independently a hydrocarbylene group; $R_5$ is a hydrocarbyl group; and a is a number from zero to 50 provided that at least one a is a number greater than zero.

8. The composition of 1 wherein the boron-containing composition is prepared from a mixture of an N-alkyl alkanolamine and an alkyl terminated polyoxyethylene glycol or polyoxypropylene glycol, or mixtures thereof.

9. The composition of 1 wherein the boron-containing composition is formed by reacting the boron source with an amount of the mixture of an alkyl terminated polyoxyalkylene glycol and an N-alkyl alkanolamine which provides three hydroxyl groups for every one boron atom.

10. The composition of claim 1 wherein (A) is present from about 70 to about 99% by weight and (B) is present from about 1 to about 30% by weight of the composition.

11. The composition of claim 1, further comprising:
(C) at least one polyoxyalkylene glycol or at least one carboxylic ester.

12. The composition of claim 11 wherein (A) is present in an amount from 70 to 98.9% by weight, (B) is present in an amount from 0.1 to 29% by weight, and (C) is present in an amount from 1 to 29.9% by weight.

13. A composition, comprising:
(A) a major amount of a fluorohydrocarbon containing one or two carbon atoms; and
(B) a minor amount of at least one soluble boron-containing composition represented by one of the formulae:

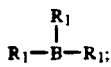 (I)

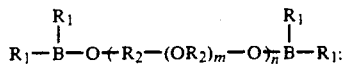 (II)

or

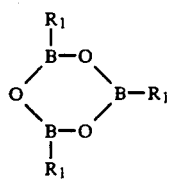 (III)

wherein m is a number from zero to 50; wherein n is zero or one; wherein each $R_1$ is independently a hydrocarbyloxy group, a hydrocarbyl oxyalkylene group, a hydrocarbylcarbonyl polyoxyalkylene, or two $R_1$ groups taken together form

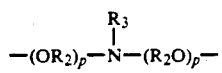

wherein each $R_2$ is independently a hydrocarbylene group; wherein $R_3$ is a hydrocarbyl group or a hydrocarbylcarbonyl group; and wherein p is a number from 1 to about 50.

14. The composition of claim 13 wherein the fluorohydrocarbon (A) is 1,1,1,2-tetrafluoroethane.

15. The composition of claim 13 wherein each $R_1$ is independently a hydrocarbyloxy group having from 1 to about 18 carbon atoms; a hydrocarbyl terminated polyoxyethylene having from 2 to about 20 oxyalkylene groups and from 1 to about 18 carbon atoms in the hydrocarbyl group; a hydrocarbyl carbonyl polyoxyalkylene having from 2 to about 20 oxyalkylene groups and from 1 to about 18 carbon atoms in the hydrocarbyl group, or two $R_1$ groups taken together form

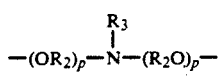

wherein each $R_2$ is independently a hydrocarbylene group having 1 to about 10 carbon atoms; $R_3$ is a hydrocarbyl group having 1 to about 18 carbon atoms; and p is 1 to about 30.

16. The composition of claim 13 wherein each $R_1$ is independently a straight-chain alkyloxy group having from 1 to about 10 carbon atoms, a branched-chain alkyloxy group having from 3 to about 16 carbon atoms, an alkyl terminated oxyethylene group, oxypropylene group, or mixtures thereof wherein the alkyl group contains from 1 to about 16 carbon atoms; or wherein two $R_1$ groups taken together form

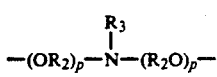

wherein $R_3$ is an alkyl group having from 1 to about 18 carbon atoms or an alkyl carbonyl group having 1 to about 18 carbon atoms in the alkyl group and wherein each p is independently a number from 1 to about 30.

17. The composition of claim 13 wherein each $R_2$ is independently an ethylene or propylene group.

18. The composition of claim 13 wherein n equals zero.

19. The composition of claim 13 wherein n equals one.

20. The composition of claim 13 wherein the boron-containing composition is represented by Formula I.

21. The composition of claim 20 wherein one $R_1$ is an alkyl terminated polyoxyethylene, polyoxypropylene or mixtures thereof, wherein the alkyl group contains from 1 to about 16 carbon atoms; and the other $R_1$ groups taken together form a

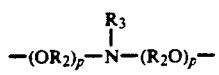

group wherein each $R_2$ is independently an ethylene or propylene group $R_3$ is an alkyl group having from 1 to about 4 carbon atoms and p is a number from 1 to about 30.

22. The composition of claim 13 wherein the boron-containing composition is represented by Formula II.

23. The composition of claim 13 wherein the boron-containing composition is represented by Formula III.

24. The composition of claim 13 wherein (A) is present from about 70 to about 99% by weight and (B) is present from about 1 to about 30% by weight of the composition.

25. The composition of claim 13, further comprising:
(C) at least one polyoxyalkylene glycol or at least one carboxylic ester.

26. The composition of claim 25 wherein (A) is present in an amount from 70 to 98.9% by weight, (B) is present in an amount from 0.1 to 29% by weight, and (C) is present in an amount from 1 to 29.9% by weight.

27. A composition, comprising:
(A) a major amount of a fluorohydrocarbon containing one or two carbon atoms; and
(B) a minor amount of a boron-containing composition of the formula

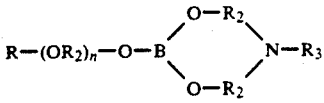

wherein R is a straight-chain alkyl group having from 1 to about 8 carbon atoms or a branched-chain alkyl group having from 3 to about 16 carbon atoms, n is 1 to about 50,
each $R_2$ is independently an alkylene group having from 2 to about 8 carbon atoms, and $R_3$ is an alkyl group having from 1 to about 8 carbon atoms.

28. The composition of claim 27 wherein the fluorohydrocarbon (A) is 1,1,1,2-tetrafluoroethane.

29. The composition of claim 27 wherein R is an methyl, ethyl, butyl, iso-octyl, iso-deoyl or iso-dodecyl group, n is about 2 to about 20, each $R_2$ is independently an ethylene or propylene group, and $R_3$ is a methyl, ethyl, propyl or butyl group.

30. The composition of claim 27 wherein (A) is present from about 70 to about 99% by weight and (B) is present from about 1 to about 30% by weight of the composition.

31. The composition of claim 27, further comprising:
(C) at least one polyoxyalkylene glycol or at least one carboxylic ester.

32. The composition of claim 31 wherein (A) is present in an amount from 70 to 98.9% by weight, (B) is present in an amount from 0.1 to 29% by weight, and (C) is present in an amount from 1 to 29.9% by weight.

33. A method of lubricating metal parts comprising contacting the metal parts with the composition of claim 1.

34. A method of lubricating metal parts comprising contacting the metal parts with the composition of claim 13.

35. A method of lubricating metal parts comprising contacting the metal parts with the composition of claim 27.

* * * * *